June 24, 1930.  C. A. MacMILLER  1,768,123

HEATER

Filed May 21, 1927

Inventor
C. A. MacMiller

By Lacy & Lacy, Attorneys

Patented June 24, 1930

1,768,123

UNITED STATES PATENT OFFICE

CARL A. MacMILLER, OF HIBBING, MINNESOTA

HEATER

Application filed May 21, 1927. Serial No. 193,227.

The object of this invention is to maintain a clear vision so that the roadway may be clearly observed by the driver of a motor vehicle, when protected by a windshield. In cold weather the windshield and windows of a closed car become obscured by moisture condensing thereon, and frequently freezing, and the principal object of this invention is to prevent the condensing of vapor upon the windshield and other windows of an enclosed motor vehicle, and at the same time to warm the vehicle and thereby add to the comfort of the occupants.

In accordance with the present invention an air pipe is associated with the exhaust manifold of an internal combustion engine and air circulated through said pipe is heated and discharged into the interior of the vehicle body in such manner as to warm the vehicle and prevent moisture in the air from condensing upon the windshield or the windows, and in consequence, a clear and unobstructed vision is assured.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Corresponding and like parts are referred to in the following description and designated in the several views of the drawings by like reference characters.

Figure 1:
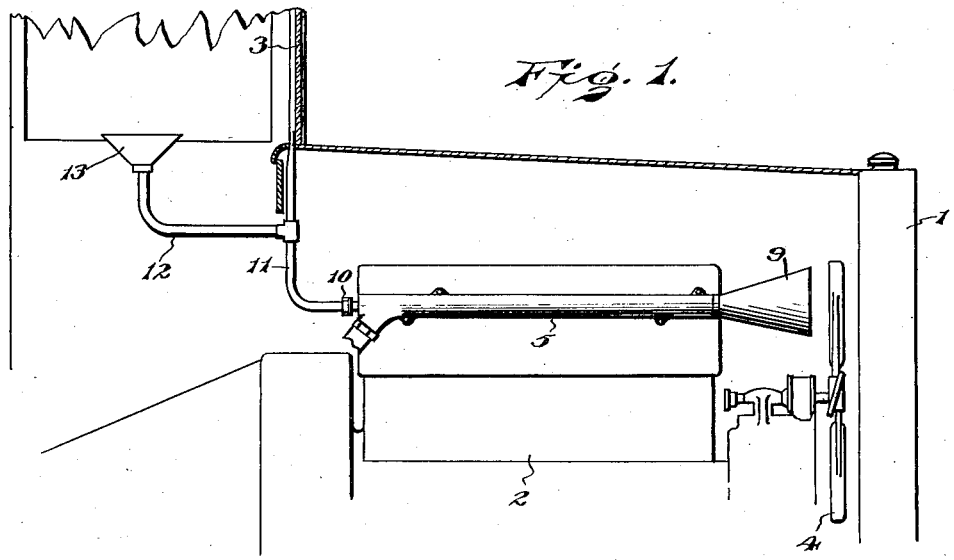
Figure 1 is a side view illustrative of an embodiment of the invention.
Figure 2:
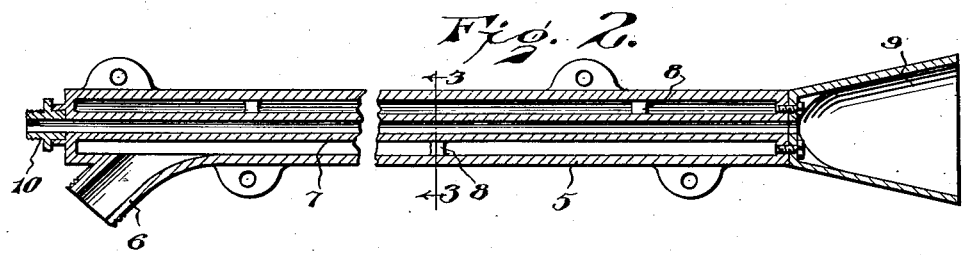
Figure 2 is a central, longitudinal, sectional view of the heater, the parts being on a larger scale.
Figure 3:
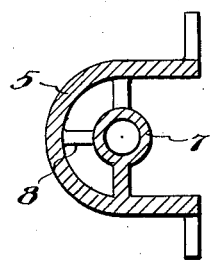
Figure 3 is a transverse sectional view on the line 3—3 of Figure 2.

The numeral 1 designates the radiator, 2 the engine, and 3 the windshield of a motor vehicle. The fan 4 for drawing air through the radiator 1 may be of any well known construction. The foregoing enumerated parts are of well known construction and arrangement and are illustrated to demonstrate the application of the invention.

The exhaust manifold 5 may be of any determinate construction and is formed with a spud 6 for the coupling of the exhaust pipe thereto for receiving the exhaust from the engine in a manner well understood. An air pipe 7 is disposed within the manifold 5 and preferably forms a part thereof being cast therewith. The air pipe 7 extends through opposite ends of the manifold. Studs 8 connect the air pipe 7 at different points in its length with the walls of the manifold 5, thereby maintaining the air pipe in spaced relation from the walls of the manifold. A funnel 9 is attached to the forward end of the manifold 5 and is in communication with the air pipe 7 and is disposed to receive air from the fan 4, with the result that air is positively circulated through the pipe 7. A coupling 10 is fitted to the rear end of the air pipe 7 and a distributing pipe 11 is connected thereto and arranged to deliver the warm air to the interior of the vehicle in a manner to prevent moisture condensing upon the windshield 3.

In the operation of the invention a portion of the air drawn through the radiator 1 by means of the fan 4 is forced into the funnel 9 and compelled to pass through the pipe 7 and pipe 11 to the interior of the car to warm the same or to such point as to prevent moisture condensing upon the windshield. The air in its passage through the pipe 7 is heated by reason of the exhaust discharged from the engine into the manifold. By having the pipe 7 cast with the manifold loose joints are prevented and there is no chance for the exhaust gases to mix with the air, hence the latter is supplied to the vehicle pure and warm, thereby adding to the comfort of the occupants in cold weather. A pipe 12 connects with the pipe 11 and terminates in a nozzle 13 adjacent the lower front window. The ascending current of warm air prevents moisture condensing upon the windshield and windows and assures a clear vision. It is also observed that the air supplied to and passing through the pipe 7 is pure and free from contamination by gas or other impurity.

The device, as stated, consists of a casting in the form of an elongated hollow body which is open at its rear and closed at its ends. When in place the open rear side of the hollow body is closed by the side of the engine to which the device is attached.

Having thus described the invention, I claim:

A combined exhaust manifold and air heater for motor vehicles consisting of an elongated hollow body closed at opposite ends and wholly open at its rear side which is closed by a side of the engine to which the body is attached, an air pipe within and integral with the body and extending through the closed ends thereof, said body having an integral spud adjacent one end for attachment of the exhaust pipe thereto, and a funnel removably attached to the opposite end of the body and in communication with the air pipe to supply air thereto.

In testimony whereof I affix my signature.

CARL A. MacMILLER. [L. S.]